July 26, 1960 R. A. DEIBEL ET AL 2,946,078
WINDSHIELD WIPER
Filed Jan. 23, 1957
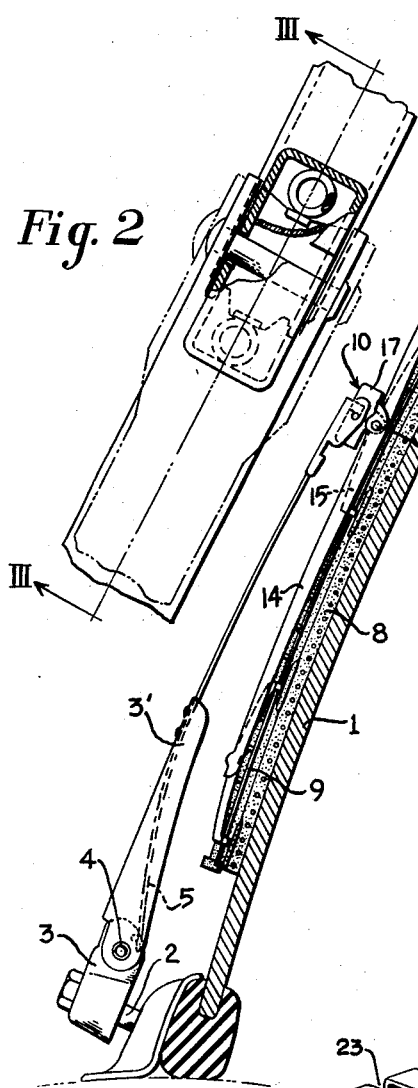
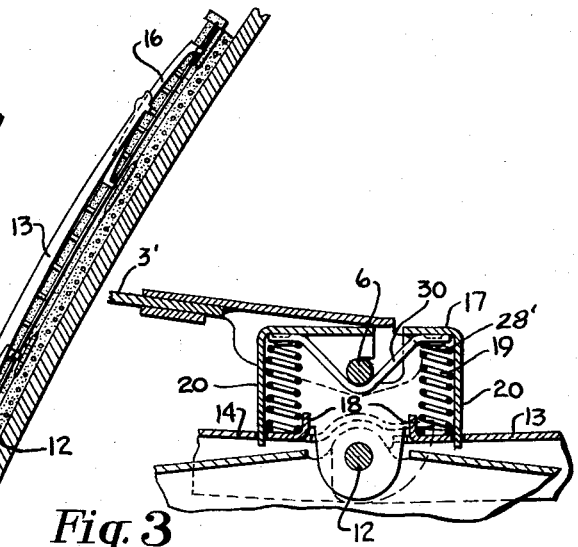
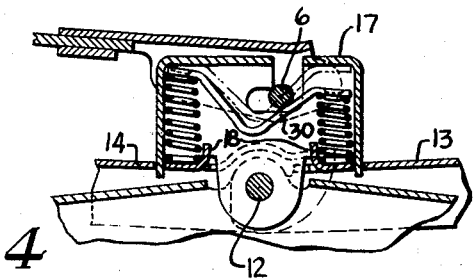
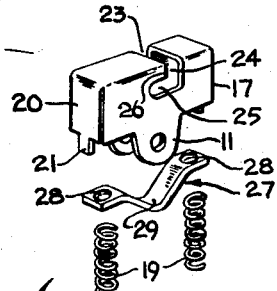
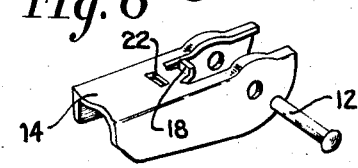
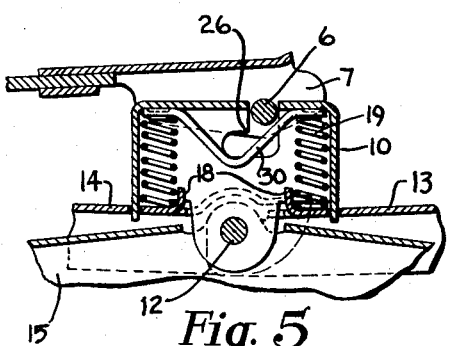
INVENTOR.
RAYMOND A. DEIBEL and
BY ANTHONY C. SCINTA
Bean Brooks Buckley & Bean
ATTORNEYS

United States Patent Office 2,946,078
Patented July 26, 1960

2,946,078
WINDSHIELD WIPER

Raymond A. Deibel, Cheektowaga, and Anthony C. Scinta, Hamburg, N.Y., assignors to Trico Products Corporation, Buffalo, N.Y.

Filed Jan. 23, 1957, Ser. No. 635,860

9 Claims. (Cl. 15—250.32)

This invention relates to the windshield cleaner art and more particularly to an improved wiper for curved contours.

Heretofore, this type of wiper has employed a spring energized superstructure to enforce the wiping element to follow the surface contour, and separate spring means to latch the wiper to its actuating arm.

The primary object of this invention is to provide an improved wiper which is effective in maintaining wiping contact with the irregularly curved contours of present day windshields.

A further object of the present invention is to simplify the wiper construction in a manner that will facilitate the mounting and demounting of the wiper through an improved interlock that will insure satisfactory performance.

The foregoing and other objects will manifest themselves as this description progresses, reference being made herein to the accompanying drawing, wherein—

Fig. 1 is a side elevation of the improved windshield cleaner mounted upon a section of a curved windshield;

Fig. 2 is a fragmentary plan view of the wiper with a portion of the coupler part broken away for clarity;

Fig. 3 is a fragmentary longitudinal sectional view, showing the wiper arm part operatively engaged with the coupler part;

Fig. 4 is a similar view showing the parts in their mid-position during the process of being either coupled or uncoupled from the arm in which mid-position the latch member is displaced against increased spring urge for subsequent selective projection of the coupler part relative to the arm part either into fully coupled relation or out of interlocking engagement;

Fig. 5 is another like view depicting the position of the arm part uncoupled from the coupler part; and Fig. 6 is an exploded view showing parts of the wiper coupler.

Referring more particularly to the drawing, the numeral 1 designates the curved windshield of a motor vehile at the lower side of which is journaled a rockshaft 2 having fixed thereon the mounting head 3 of a wiper arm, the outer section 3' of which has pivotal connection to the mounting head and has wiping pressure applied thereto by a spring 5. The outer end of the arm 3, 3' is provided with a coupling part having a pin or shaft 6 extending transversely of and between a pair of ears 7.

The wiper comprises a wiping blade unit and a pressure distributing superstructure, the former being composed of a flexible blade 8 and a surface conforming backing 9 and the latter being composed of a chambered coupler 10 and a pair of pressure applying levers 13 and 14 which are pivotally hung by a pin 12 to support the levers at their inner ends in longitudinal alignment above the blade unit. A central yoke 15 is also preferably suspended from the pin 12, while on the outer end of each lever is mounted a yoke 16, the several yokes having terminal claws in pairs to slidably straddle and engage the opposite longitudinal margins of the flexible backing strip 9 to hold it for surface conformance. This affords a longitudinal series of six pressure areas to which the arm pressure is applied to support the blade unit in a surface conforming manner.

The mounting coupler comprises a box 17 that is open at its bottom and has depending ears 11 by which the pin 12 may be dropped to an appropriate position. Within the chamber of the box or coupler, the inner ends of the levers 13 and 14 are formed with upstanding positioning lugs 18 for confining the lower ends of the coil springs 19 against the end walls 20 of the box 17. The end walls have depending tabs 21 slidably engaged in slots 22 in the levers for guiding support of the box. As the levers play up and down during surface conforming action, the slots 22 will slide up and down on the tabs. The springs act downwardly upon the respective levers in transmitting the wiper arm pressure to the pressure-spreading yokes 15, 16, to the backing strip and finally to the wiping edge.

The top wall of the box is provided with a transverse slot 23 which opens downwardly through registering L-shaped slots in the opposite side walls of the box to form a vertical entranceway 24 and a lateral notch or seat 25. These two slot portions 24 and 25 define an intervening shoulder 26 beneath which the coupling shaft 6 engages. This interlock between the coupling shaft and the shoulder 26 is retained by a keeper member in the form of a V-shaped frame 27, the upper ends of which are deflected to make them coplanar supports 28 for the upper ends of the coiled springs. Therefore, the springs serve an added function by affording resilient support for the keeper frame to normally hold it upwardly against the top wall of the box 17.

The keeper frame is so located with respect to the L-shaped slots 21, 22 that the crotch 29 underlies the coupler part when engaged in the offset seat 25. In this position the keeper is preferably free of the part 6 which rests upon the bottom edges of the seat under the urge of the arm spring 5. One arm 30 of the keeper extends diagonally across the entranceway 24 in a manner to yieldably obstruct movement of the coupling pin over the keeper shoulder 26 in either direction of movement and thereby requires the pin 6 to depress the retainer frame against the urge of the spring means 19 to the position illustrated in Fig. 4 to permit passage of the arm part 6 thereover. The undersides of the coplanar supports 28 have positioning bosses 28' to engage in the open upper ends of the coil springs 19 to hold them in position during the rocking of the keeper member 27.

In operation the wiper is mounted on its actuating arm by engaging the cross pin 6 in the entranceway 24 and pressing it downwardly against the keeper to depress the latter away from the shoulder 26 whereupon the pin will snap downwardly over the shoulder, Fig. 4, and be cammed into the seat 25 under the urge of the spring energized keeper to the position of Fig. 3. This is accomplished by pressing downwardly on the outer end of the arm or upwardly on the central part of the wiper. To disengage the wiper it is only necessary to depress the coupler housing 17 inwardly along its actuating arm which causes the cross pin to leave the seat and cam upon the arm 30 of the keeper frame to cam it downwardly against the spring urge until the pin slips over the keeper shoulder whereupon the spring reaction will eject the cross pin upwardly through the entranceway to release the wiper, as in Fig. 5.

The arm mounting coupler is thus engaged and disengaged by pressure applied to either the arm or wiper elements selectively in the direction of extent of the entranceway or the seat to depress the keeper to a pin releasing position whereupon the pin is released to enable the reaction of the keeper unit to position the cross pin accordingly.

The foregoing description has been given in detail without thought of limitation since the inventive principles involved are capable of assuming other physical embodiments without departing from the spirit of the invention and the scope of the appended claims.

What is claimed is:

1. A windshield cleaner comprising an arm coupler, a pair of levers pivotally mounted on the coupler and extending in opposite directions therefrom, a wiping blade unit having a wiping edge and a surface conforming backing strip therefor, said levers extending lengthwise over the blade unit, means operatively connecting the outer ends of the levers to the unit for surface conforming action, said coupler having an entranceway for receiving a part on the actuating arm and an adjoining seat with an intervening retaining shoulder, a keeper member cooperating with the retaining shoulder, and spring means yieldably urging the keeper member toward the shoulder and acting to shift an associated arm part over the shoulder selectively into either the entranceway or into the seat, said spring means reacting against said levers outwardly of the pivotal mounting thereof.

2. A curved windshield cleaner comprising a flexible wiping blade unit, and a pressure distributing superstructure including an arm attaching coupler, a pair of levers pivotally mounted on the coupler and extending in opposite directions therefrom over the blade unit, means operatively connecting the outer ends of the levers to the unit for surface conforming action, said coupler having an entranceway leading over a retaining shoulder to a seat for receiving a part on an associated actuating arm, and a keeper member spring-pressed toward the retaining shoulder and acting to shift the arm part selectively through manual guidance either into the entranceway or into the seat, the keeper member spring means reacting against the levers.

3. A windshield wiper comprising a wiper blade unit, an arm attaching member, a pair of levers arranged end to end and pivotally connected at their adjacent ends to said arm attaching member, the outer ends of the levers being operatively connected to the wiping blade unit, said arm attaching member being chambered and overlying said adjacent ends, a pair of coiled springs within the arm attaching member each seating upon a respective one of said levers outwardly of the pivotal connection, and a keeper member within the chambered attaching member acted upon jointly by said springs for interlocking engagement with an arm inserted part.

4. For use in attaching a windshield wiper element to its actuating arm element, a coupler mountable on one element for interlocking engagement with a part on the other element, said one element including a pressure distributing member movable relative to said coupling, said coupler having an entranceway leading over a retaining shoulder to a seat, and a keeper member spring-pressed toward the retaining shoulder for maintaining the part interlocked with said seat while being substantially free of the part, said keeper member being displaceable against the spring urge by the other element part during its movement thereover in either direction to selectively shift the element part through manual guidance into either the entranceway or the seat the keeper member spring means reacting against said pressure distributing means.

5. A windshield wiper for being coupled to an actuating arm having a transverse part, said wiper comprising a chambered housing provided with an entrance slot leading to a lateral seat for receiving the arm part, and a keeper member independently yieldably supported adjacent its opposite ends in the chamber and having a cam surface inclining across the slot to deflect the arm part into the lateral seat by and during insertion of the part into the slot, said cam surface being accessible to said arm part from the seat to depress the keeper to a nonobstructing position by and upon relative movement between the housing and its engaged arm lengthwise of the latter.

6. A windshield wiper for being coupled to an actuating arm having a transverse part, said wiper comprising a chambered housing provided with an entrance slot leading to a lateral seat for receiving the arm part, a pressure distributing superstructure member movable relative to said housing, a generally V-shaped keeper member yieldably supported in the chamber for confining the arm part against said seat while being substantially free of the arm part, said keeper member having a cam surface inclining across the slot to deflect the arm part into the lateral seat by and during insertion of the part into the slot, and resilient means in the chamber so yieldably supporting the keeper member and reacting against said superstructure member.

7. A windshield wiper for being coupled to an actuating arm having a transverse part, said wiper comprising a chambered housing provided with an entrance slot leading to a lateral seat for receiving the arm part and a pressure distributing member movable relative to said housing, and a keeper member yieldably supported in the chamber for confining the arm part against said seat while being substantially free of the arm part, said keeper member having a transversely generally flat cam surface inclining across the slot to selectively deflect the arm part through manual guidance either into the lateral seat by and during insertion of the part into the slot or into the slot upon removal of the part from the seat, the keeper member yieldable support means reacting against said pressure distributing member.

8. A windshield wiper for being coupled to an actuating arm having a transverse part, said wiper comprising a chambered housing provided with an entrance slot leading to a lateral seat for receiving the arm part, a keeper member yieldably supported in the chamber and having a cam surface inclining across the slot to deflect the arm part into the lateral seat by and during insertion of the part into the slot, a surface conforming blade unit, a pair of levers interposed between the blade unit and the housing hinged to the latter in longitudinal alinement, and a pair of spring parts in the housing chamber each seating on a respective lever and yieldably supporting the keeper member.

9. A windshield wiper for being coupled to an actuating arm having a transverse part, said wiper comprising a chambered housing provided with an entrance slot leading to a lateral seat for receiving the arm part, a keeper member yieldably supported in the chamber and having a cam surface inclining across the slot to deflect the arm part into the lateral seat by and during insertion of the part into the slot, a surface conforming blade unit, a pair of levers interposed between the blade unit and the housing hinged to the latter in longitudinal alinement, a pair of spring parts in the housing chamber each seating on a respective lever and yieldably supporting the keeper member, and an arm-pressure-transmitting connection between the housing and the medial portion of the blade.

References Cited in the file of this patent

UNITED STATES PATENTS

| | | |
|---|---|---|
| 2,752,626 | Oishei | July 3, 1956 |

FOREIGN PATENTS

| | | |
|---|---|---|
| 487,114 | Canada | Oct. 7, 1952 |
| 1,069,875 | France | Feb. 17, 1954 |